Sept. 15, 1964 R. HORNE ETAL 3,149,224
HEATER CONTROL CIRCUIT
Filed Nov. 24, 1961
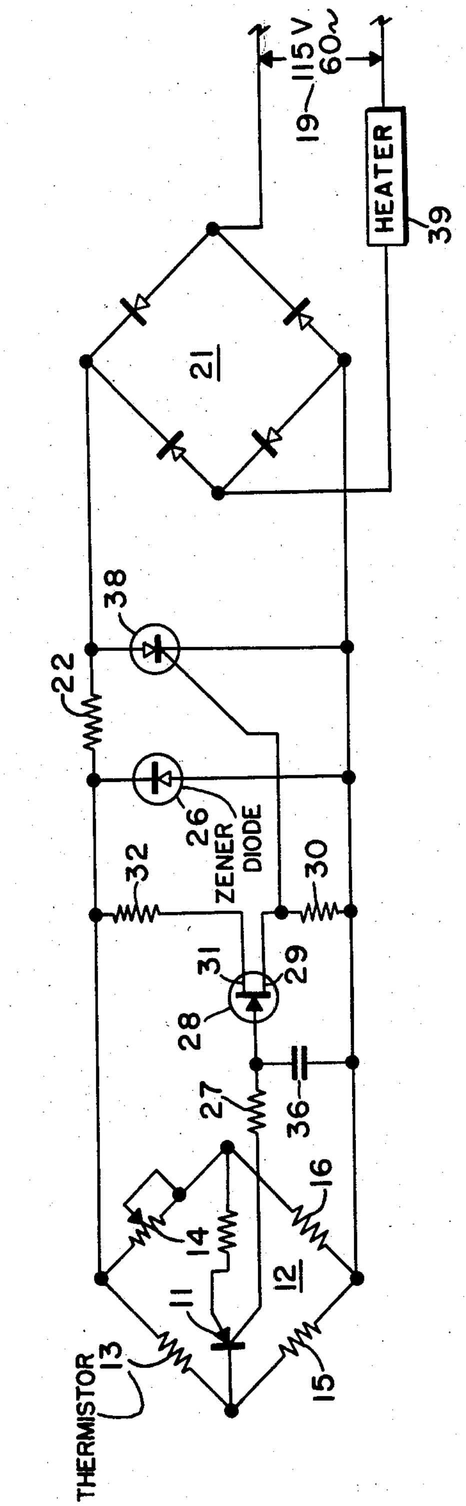
INVENTORS
RONALD HORNE
ROBERT D. TAYLOR
BY Robert L. Bird Jr.
ATTORNEY United States Patent Office 3,149,224
Patented Sept. 15, 1964

3,149,224
HEATER CONTROL CIRCUIT

Ronald Horne, Pensacola, and Robert D. Taylor, Milton, Fla., assignors, by mesne assignments, to Monsanto Company, a corporation of Delaware Filed Nov. 24, 1961, Ser. No. 154,793
5 Claims. (Cl. 219—497)

This invention relates to control circuits and more particularly to circuits for controlling heaters.

One of the disadvantages of conventional heater control circuits is that the heater is not controlled to give a precisely constant temperature. In some operations it is of no importance if the controlled temperature varies slightly from a desired value. However, in other operations, even variations of less than one degree from a desired temperature affect the results achieved in the operation. With this in mind, one of the objects of this invention is to provide a novel and improved control circuit.

Another object of this invention is to provide a system for controlling a heater to maintain a desired temperature.

A further object of this invention is to provide a compact and accurate heater control system having no moving parts.

One embodiment of the present invention contemplates a heater control circuit having a temperature sensing bridge which controls the operation of a unijunction transistor. The unijunction transistor in turn controls the operation of a silicon controlled rectifier connected in series with the heater across a power supply. When the sensed temperature drops a fraction of a degree below the desired value the bridge generates a signal to render the unijunction transistor conductive. This permits a capacitor connected to the unijunction transistor to discharge through a resistor, thereby providing a gate voltage for the silicon controlled rectifier. This allows current to flow through the heater.

Other objects and advantages of the invention will become apparent when the following detailed description is read in conjunction with the appended drawing, in which the single figure is a schematic drawing of the control circuit of the present invention.

Referring now in detail to the drawing, a bridge transistor 11 is shown having its emitter and base connected to opposite corners of a temperature sensing bridge 12. The bridge 12 includes a thermistor 13, a potentiometer 14, a resistor 15 and a resistor 16, these components being connected as shown to form a bridge of conventional configuration. Power for operating the bridge is supplied by a 115 volt A.C. power source 19 connected to the bridge through a full wave rectifier network 21 and a resistor 22. A zener diode 26 connected as shown limits the bridge voltage to a suitable value.

The collector of the bridge transistor 11 is connected through a resistor 27 to the emitter of a unijunction transistor 28 having a first base 29 connected through a resistor 30 to one side of the power supply and a second base 31 connected through a resistor 32 to the other side of the power supply.

A capacitor 36, connected between the emitter of the unijunction transistor 28 and the side of the power supply to which the first base 29 is connected, is charged by signals from the bridge transistor 11 to render the unijunction transistor conductive. When additional heat is required the transistor 11 conducts to charge the capacitor 36 through the resistor 27. The charge builds up on the capacitor 36 until the voltage across the capacitor is sufficiently high to trigger the unijunction transistor 28. When this occurs, the resistance between the emitter of the transistor 28 and the first base 29 drops to substantially zero to permit the capacitor 36 to discharge through the resistor 30. This develops a gate voltage across the resistor 30.

The junction of the first base 29 and the resistor 30 is connected as shown to the base of a silicon controlled rectifier 38 connected in series with a heater 39 across the power supply 19. The gating voltage across the resistor 32 triggers the silicon controlled rectifier 38 to render it conductive so that current flows through the heater 39 to raise the temperature to be controlled.

An out-of-balance condition in the bridge changes the rate of conduction of the bridge transistor 11, the bridge being further out of balance as more heat is required. The rate of conduction of the bridge transistor 11 determines the charging rate of the capacitor 36. The charging rate of the capacitor 36 determines the period of conduction of the unijunction transistor 28 in each half cycle of the voltage applied thereto. This, in turn controls the conduction of the silicon controlled rectifier 38 which connects the heater 39 to the power supply.

Thus, the circuit does not apply power to the heater continuously until the desired temperature is reached, but proportions the operation of the heater in accordance with the amount of heat that is required to raise the controlled temperature to the desired value. In other words, as the controlled temperature approaches the desired value, the period of conduction of the rectifier 38 during each half cycle of the applied power decreases. In this manner, the controlled temperature is brought up smoothly to the desired value and does not overshoot. This results in a very precise and accurate control of the temperature.

The sensitivity of the circuit can be adjusted by adjusting the potentiometer 14 to vary the charging rate of the capacitor 36. This adjusts the value to which the controlled temperature is raised. The system shown herein provides an accurate and precise control of the heater to maintain a temperature within precise limits. Because of the absence of moving parts and conventional electron tubes, the life of the system is lengthened considerably.

It is to be understood that the embodiment of the invention disclosed herein can be modified or altered and that numerous other embodiments can be contemplated which will fall within the spirit and scope of the invention.

What is claimed is:

1. A heater control circuit, comprising a power supply, a semi-conductor, a heater connected in series with the semi-conductor across the power supply, a temperature-sensing bridge connected to the power supply, a resistor connected to the bridge, a capacitor connected to the resistor and to one side of the power supply, semi-conductive means connected to the junction of the resistor and the capacitor and to said one side of the power supply so that a charge on the capacitor renders said semi-conductive means conductive, a second resistor connected to the semi-conductive means in such a manner that conduction of said semi-conductive means connects the capacitor to the second resistor for discharge therethrough, said semi-conductor being connected to the junction of the semi-conductive means and the second resistor so that said semi-conductor is rendered conductive when the capacitor discharges through the second resistor.

2. A control circuit, comprising a temperature sensing bridge, a bridge transistor connected across the bridge for conduction when the sensed temperature falls below a predetermined value, a unijunction transistor connected to the bridge transistor, a capacitor connected across the unijunction transistor for storing a charge when the bridge transistor conducts to thereby render the unijunction transistor conductive, a resistor connected to the unijunction transistor in such a manner that conduction of said unijunction transistor connects the capacitor to said resistor for discharge therethrough, a power supply, a heater, and a silicon controlled rectifier connected in series with the heater across the power supply, said rectifier being connected to the resistor so that when the capacitor discharges through said rectifier the silicon controlled rectifier conducts to allow current to flow through the heater.

3. A heater control circuit, comprising a power supply, a temperature sensing bridge, semi-conductor means connected across the bridge, a resistor connected to the semi-conductor means, a capacitor connected between the resistor and one side of the power supply, a semi-conductor connected to the junction of the resistor and capacitor and to said one side of the power supply so that a charge on the capacitor renders the semi-conductor conductive, a second resistor connected between the semi-conductor and said one side of the power supply so that conduction of said second semi-conductor connects the capacitor to the second resistor for discharge therethrough, a heater connected to the power supply, and a second semi-conductor connected in series with the heater across the power supply, said second semi-conductor being connected to the second resistor so that said discharge triggers said second semi-conductor to apply power to the heater.

4. A heater control circuit, comprising an A.C. power supply, a rectifying network connected to the power supply, a heater connected between the rectifying network and the power supply, a silicon controlled rectifier connected across the rectifier output so that conduction of said silicon controlled rectifier allows current to flow through the heater, a first resistor, a voltage limiting diode connected in series with the first resistor across the silicon controlled rectifier, a temperature sensing bridge connected in parallel with the diode, a transistor having its base and emitter connected across the output of the bridge, a second resistor connected to the collector of the transistor, a capacitor connected between the second resistor and one side of the diode, a unijunction transistor having the emitter thereof connected to the junction of the second resistor and the capacitor and the bases thereof connected through a pair of base resistors to opposite sides of the diode so that conduction of the unijunction transistor connects the capacitor to one of said base resistors for discharge therethrough, said silicon controlled rectifier having the base thereof connected to the junction of said one base resistor and the base of the unijunction transistor connected thereto so that said discharge triggers said silicon controlled rectifier to apply power to the heater.

5. A heater control circuit, comprising a power supply, a temperature sensing bridge connected to the power supply, a bridge transistor connected across the bridge, a first resistor connected to the output of the bridge transistor, a capacitor connected between the resistor and one side of the power supply so that when the bridge is out of balance in one direction current will flow through the the resistor to charge the capacitor, a second transistor connected to the junction of the resistor and the capacitor in such a manner that a predetermined charge on said capacitor causes said second transistor to become conductive, a second resistor connected between the second transistor and said one side of the power supply for discharging the capacitor when said second transistor becomes conductive, a heater, and a third transistor connected to the power supply in series with the heater, said third transistor having an element thereof connected to the junction of the second transistor and the second resistor so that the voltage developed across said second resistor during discharge of the capacitor renders the third transistor conductive to apply power to the heater.

References Cited in the file of this patent

UNITED STATES PATENTS

| | | |
|---|---|---|
| 2,864,978 | Frank | Dec. 16, 1958 |
| 3,040,157 | Hukee | June 19, 1962 |
| 3,109,910 | Fogleman | Nov. 5, 1963 |